United States Patent
Andoni

(10) Patent No.: US 9,438,568 B2
(45) Date of Patent: Sep. 6, 2016

(54) SYSTEM AND METHOD FOR EMAIL AND FILE DECRYPTION WITHOUT DIRECT ACCESS TO REQUIRED DECRYPTION KEY

(71) Applicant: Zeva Incorporated, Chantilly, VA (US)

(72) Inventor: Issam Andoni, Chantilly, VA (US)

(73) Assignee: ZEVA INCORPORATED, Chantilly, VA (US)

( * ) Notice: Subject to any disclaimer, the term of this patent is extended or adjusted under 35 U.S.C. 154(b) by 0 days.

(21) Appl. No.: 14/066,131

(22) Filed: Oct. 29, 2013

(65) Prior Publication Data

US 2015/0039889 A1   Feb. 5, 2015

Related U.S. Application Data

(60) Provisional application No. 61/861,869, filed on Aug. 2, 2013.

(51) Int. Cl.
| H04L 29/06 | (2006.01) |
| H04L 9/08  | (2006.01) |
| H04L 9/32  | (2006.01) |

(52) U.S. Cl.
CPC ......... H04L 63/0428 (2013.01); H04L 9/0825 (2013.01); H04L 9/3263 (2013.01)

(58) Field of Classification Search
CPC ... H04L 63/062; H04L 63/0823; H04L 9/32; H04L 9/08; H04L 9/3263
USPC .......................................... 713/170; 380/279
See application file for complete search history.

(56) References Cited

U.S. PATENT DOCUMENTS

| 6,775,382 | B1 * | 8/2004 | Al-Salqan ................... 380/286 |
| 7,231,516 | B1 * | 6/2007 | Sparrell et al. .............. 713/156 |
| 7,334,125 | B1 * | 2/2008 | Pellacuru .................... 713/163 |
| 7,370,200 | B2 * | 5/2008 | Kindberg et al. ............ 713/168 |
| 2003/0169883 | A1 * | 9/2003 | Leroux et al. ............... 380/277 |
| 2007/0005976 | A1 * | 1/2007 | Riittinen .................... 713/175 |
| 2007/0124471 | A1 * | 5/2007 | Harada et al. ............... 709/225 |
| 2009/0086977 | A1 * | 4/2009 | Berggren .................... 380/279 |
| 2010/0002880 | A1 * | 1/2010 | Yoon et al. .................. 380/255 |
| 2012/0102085 | A1 * | 4/2012 | Gretter ........................ 709/201 |
| 2012/0284506 | A1 * | 11/2012 | Kravitz et al. ............... 713/151 |

OTHER PUBLICATIONS

Chen, "Design and Implementation of Smartcard-based Secure E-Mail Communication", 2003, IEEE, p. 225-231.*

* cited by examiner

Primary Examiner — Thanhnga B Truong
Assistant Examiner — Gregory Lane
(74) Attorney, Agent, or Firm — Buchanan Ingersoll & Rooney PC

(57) ABSTRACT

Exemplary systems and methods are directed to decrypting electronic messages in a network. The system includes a processor configured to receive or monitor message sources for encrypted messages, where private keys associated with the encrypted messages are not previously provided to the system. For each message, extract a set of user certificate identifiers and corresponding encrypted session keys, securely communicate with private key provider to decrypt the encrypted session key with an acquired private key, and decrypt the message with the unencrypted session key.

19 Claims, 6 Drawing Sheets

SYSTEM AND METHOD FOR EMAIL AND FILE DECRYPTION WITHOUT DIRECT ACCESS TO REQUIRED DECRYPTION KEY

FIELD

The disclosed embodiments are directed to a system and method for the decryption of electronic messages and documents without direct access to required decryption key.

BACKGROUND

Companies and governmental agencies must deal with the conflicting objectives of ensuring that data is kept secure and private, and ensuring that data is available for inspection to comply with legal, regulatory, and litigation requirements. Common data protection techniques include encryption, which complicates the process of timely data delivery needed to support eDiscovery demands. The collection and processing of Electronically Stored Information (ESI) must include methods to deal with encrypted data, and this often results in significant delays in an organization's ability to complete investigations.

The most common sources of ESI for eDiscovery processing are electronic mail (email) and common industry formats of computer data files. With encryption becoming a more common technique to secure electronic communications and data stored electronically, additional eDiscovery processes must be in place to deal with encrypted data.

Some eDiscovery tools perform indexing of message content to support search capabilities, and some organizations index all content in anticipation of search requirements. The features of these eDiscovery products exclude all encrypted (e.g., undecrypted) content from indexing routines, dramatically reducing the effectiveness of eDiscovery search operations.

The technology industry's most common standard for securing email communications through encryption is S/MIME (Secure Multipurpose Internet Mail Extensions). Many organizations have adopted S/MIME, and as a result must deal with the obstacles to their search requirements for eDiscovery. Other industry standards for encryption formatting are available.

Known commercially available tools and products capable of providing decryption under the conditions that services the specified private keys for decrypting the data are directly available. These private keys are most often retrieved and copied manually during the decryption process, which adds enormous manual burden on the person performing the decryption. In addition, known methods can specify that the private key, which is highly sensitive, be provided to the end user in the process, which raises the potential of unauthorized information exposure and misuse of the private key.

With the introduction of the U.S. Government Homeland Security Presidential Directive 12 (HSPD-12) in 2004, and the implementation of the Personal Identity Verification (PIV) technology which stores digital certificates in smart card devices, the cyber security industry has seen a rapid increase in smart card adoption. This dramatically increases the complexity in encryption and decryption services. For example, while escorting a soft copy of a private key through the decryption process supports the use of current commercially available decryption tools, escorting a smart card protected private key represents a huge challenge. Smart card protected private keys can call for much stricter compliance standards, such as with the Federal Information Processing Standards (FIPS-2) when used for U.S. Government applications. These compliance specifications provide for the increased protection of private keys stored on hardware models.

SUMMARY

An exemplary system for decrypting electronic messages in a network is disclosed. The system comprising: a processor configured to receive or monitor message sources on a network for encrypted messages, wherein private keys associated with the encrypted messages are not previously provided to the processor, wherein for each message the processor is configured to extract a set of user certificate identifiers and corresponding encrypted session keys, securely communicating with private key provider to acquire a private key for decrypting the encrypted session key, and decrypt the message with the unencrypted session key.

An exemplary method system for decrypting electronic messages in a system having at least one computing device connected to a network, the method comprising: receiving or monitoring a network for encrypted messages sent by at least one message source on the network, wherein private keys associated with the encrypted messages are not previously provided to the system; and for each received message: extracting a set of user certificate identifiers and corresponding encrypted session keys; securely communicating with a private key provider to obtain a private key for decrypting the encrypted session key; and decrypting the message with the unencrypted session key.

An exemplary computer readable medium for executing a method for decrypting electronic messages in a network is disclosed. The method comprising: monitoring the network for encrypted messages sent by at least one message source, wherein private keys associated with the encrypted messages of the message source are not previously provided to the processor; and for each received message: extracting a set of user certificate identifiers and corresponding encrypted session keys; sending the certificate identifiers to a key management server to obtain a private key for decrypting the encrypted session key; and decrypting the message with the unencrypted session key.

An exemplary system for decrypting electronic messages is disclosed. The system comprising: a processor configured to monitor message sources on a network for encrypted messages wherein private keys associated with the encrypted messages are not previously provided to the system, and decrypt at least one message with a session key obtained based on a private key acquired over a network connection.

DESCRIPTION OF THE DRAWINGS

In the following the disclosure will be described in greater detail by means of exemplary embodiments with reference to the accompanying drawings, in which.

DETAILED DESCRIPTION

Figure 1:
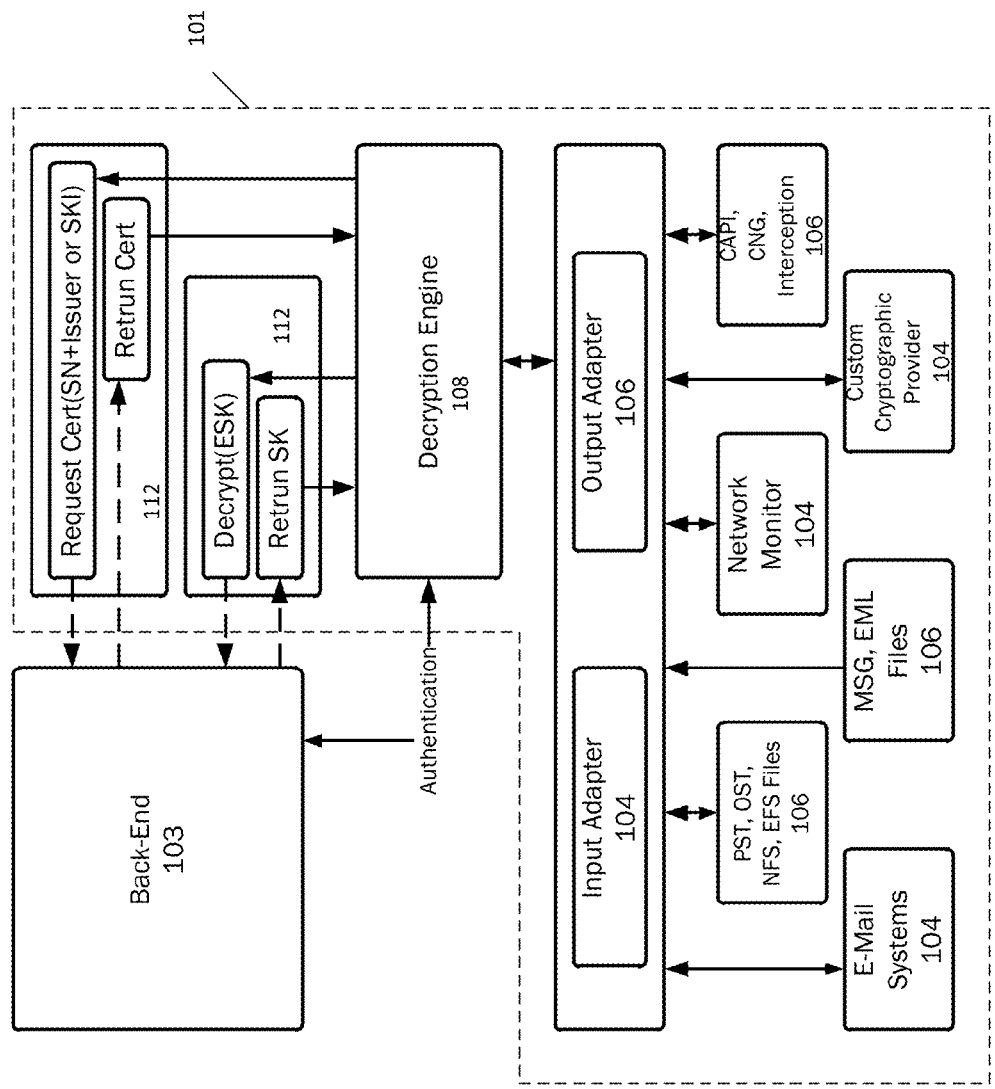
FIG. 1 illustrates a system front end in accordance with an exemplary embodiment of the present disclosure.

In the context of the exemplary embodiments of the present disclosure, encryption and decryption techniques use digital certificates based on Public Key Infrastructure (PKI) standards. Moreover, Encrypted messages can include any electronic object that is encrypted using PKI standards, such as Cryptographic Message Syntax (CMS), for example. The term session key can be used to describe the key used to encrypt/decrypt the message content, and private key can describe the key used to decrypt the session key.

The design described herein includes a unique and automated method and system to securely accomplish email and file decryption without direct access to decryption keys. This method eliminates the need to have the private key manually escorted to where the decryption operation is taking place. The proposed method and system can be integrated with existing decryption technologies, allowing them to decrypt encrypted messages without the need to have direct access to required private keys.

In addition, the method and system described enables organizations to implement security inspection monitoring, capable of inspecting PKI encrypted materials prior to introduction into, or exit from, organizational networks. This significantly enhances the protection to an organization's electronic data and infrastructure. Many government agencies and commercial corporations implement systems to inspect electronic traffic at the outside boundary of their network; however this method has the inherent weakness of passing encrypted message content without inspection. The method and system described herein can be used to inspect the encrypted content, thereby protecting the organization from leakage of sensitive information, and from malware introduced inside transmitted encrypted messages. Without the proposed technology there is currently no commercially feasible way to decrypt these messages and inspect them for compliance.

Exemplary embodiments of the present disclosure are directed to a system and method that can decrypt the content of encrypted messages without the need for direct access to any corresponding decryption key. The system including a processor configured to monitor electronic objects for encrypted messages. For each encrypted message, the processor extracts a set of user certificate identifiers and their corresponding encrypted session keys (ESK), and sends the ESKs to a Key Management Service (KMS) for session key decryption. The KMS can communicate with a configured Certificate Authority (CA) or any other private key provider as needed to securely retrieve at least one corresponding private key, use the retrieved private key to decrypt the encrypted session key, which will be used to decrypt the message. A hardware Security Model (HSM) can be used to provide secure storage for private keys.

Exemplary embodiments of the present disclosure provide a system configured to perform decryption at the time of data collection and/or while the packets are in-flight or flowing through the network, which can dramatically increase productivity. As a result of these features and other aspects that are hereafter described in further detail, the exemplary embodiments disclosed herein provide advantages over known decryption solutions, which call for manual steps and/or steps performed on stored or archived messages. First, the exemplary systems and methods enable bulk decryption of electronic messages in real-time. Second, the disclosed systems and methods can extend known decryption methods by allowing these methods to decrypt encrypted messages without prior access to specified private keys. As a result, an unencrypted stream of encrypted messages can be provided for inspection, analysis, and reporting.

Exemplary embodiments described herein include a computing device such as computer or computer system that includes at least one processor or processing device, memory, a network interface, and a user interface. The computing device can be configured with a computer program or program code to execute a method for receiving encrypted messages, decrypting the received messages, and sending the decrypted messages to an output adaptor. The processor can include any of known processing devices suitable for operation with a client or server computer system that provides for the creation and/or retrieval of an encrypted message. The processing unit may be configured to connect to a communications infrastructure for communication with additional components of the computing system.

The communications infrastructure can include an input/output adaptor be a bus, message queue, network, multi-core message-passing scheme, a combination thereof, or any other suitable type or configuration of communications infrastructure as will be apparent to persons having skill in the relevant art. The computing device may further include a display unit. The display unit can be configured to control a display device, which can be connected to the computing system physically (e.g., via a cable, such as a VGA, DVI, or HDMI cable) or wirelessly (e.g., via Bluetooth, etc.). The display unit may be a video card, video adaptor, graphics card, display card, graphics board, display adaptor, graphics adaptor, video controller, graphics controller, etc., and can be integrated into the computing system or can be removable.

The display device may be configured to display information (e.g., data, graphics, output from an application program, etc.) transmitted to the display device via the display unit. Suitable types of display devices 6 for use as the display device will be apparent to persons having skill in the relevant art and can include a liquid crystal display (LCD), light-emitting diode (LED) display, thin film transistor (TFT) LCD, capacitive touch display, etc., or other suitable display technology as desired.

The computing device can further include a memory unit. The memory unit may be any type of memory suitable for the storage of data and performing of the functions disclosed herein, such as a hard disk drive, floppy disk drive, magnetic tape drive, optical disk drive, solid state drive, or other suitable non-transitory computer readable medium. In some embodiments, the memory unit can be removable storage (e.g., flash memory, a compact disc, digital versatile disc, Blu-ray disc, etc.) or a combination of non-removable and removable storage. In an exemplary embodiment, the memory unit can be external to the computing system and accessed via a network by a communications interface, discussed in more detail below, such as cloud storage. The memory unit may include random access memory (RAM), read-only memory (ROM), or a combination thereof. Suitable types and configurations of the memory unit will be apparent to persons having skill in the relevant art.

The communications interface can be configured to allow software and data to be transmitted between the computing system and external networks and devices. The communications interface 10 may be a modem, network interface card (e.g., an Ethernet card), a communications port, a Personal Computer Memory Card International Association (PCMCIA) card, or other type of communications interface suitable for performing the functions disclosed herein as will be apparent to persons having skill in the relevant art. Software and data transmitted to or from the computing system may be in the form of signals, which may be electronic, electromagnetic, optical, etc.

The signals may travel via a communications path, which may be configured to carry the signals physically or wirelessly via a network. For example, computing device can be configured to execute a method for receiving encrypted messages, decrypting the received messages, and sending the decrypted messages to another computing or storage device on the network. The email can be communicated over a network via the network interface under the Simple Mail Transfer Protocol (SMTP), Post Office Protocol (POP), or Internet Message Access Protocol (IMAP), or any other suitable transmission protocol as desired. As already discussed, the email messages can be transferred over a network in a secure format using Secure/Multipurpose Internet Mail Extensions (S/MIME) or other known protocol for sending and receiving protected Multipurpose Internet Mail Extension (MIME) data. The communications path can carry signals from the communications interface to a network such as a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art.

The communications interface can be further configured to connect the computing system with a plurality of input devices, which can enable a user of the computing system to control the system. In some instances, the communications interface can include multiple interfaces or connections, for connecting to a variety of external devices or networks. For example, the communications interface can include a plurality of universal serial bus (USB) connectors, an Ethernet connector, audio connectors, video connectors, etc. Suitable types of input devices that can be used with the computing system for providing input will be apparent to persons having skill in the relevant art and can include a keyboard, mouse, touch screen, tablet, click wheel, trackball, microphone, camera, etc.

It will be apparent to persons having skill in the relevant art that methods and processes disclosed herein can be implemented in the computing system using hardware, software, firmware, non-transitory computer readable media having instructions stored therein, or a combination thereof, and can be implemented in more than one computing systems or other processing systems. It will be further apparent to persons having skill in the relevant art that the configuration of the computing system as illustrated in FIGS. 1-6 are provided as illustrations, and other configurations and systems for performing the functions disclosed can be appropriate.

The system described in accordance with exemplary embodiments of the present disclosure can have a centralized system architecture or distributed system architecture. The system 100 can includes a front end 101 and a backend 103. In the centralized system architecture, the front end 101 and back end 103 are integrated into a single computing device 102. In the distributed configuration, separation of the front end 101 and backend 103 allows for the separation of the front end components that process and decrypt messages, from the back end components that retrieves and manages private keys. For example, the back-end service (e.g., back end) 103 and front-end service 101 can be implemented through one or a plurality of computing devices 102 programmed with suitable program code as desired.

The front-end service (e.g., front-end) 101 can be configured to decrypt and process the encrypted messages. The back-end service 103 can be configured to provide the retrieval and management of encryption keys either directly from a Certificate Authority 116 or from another suitable means. As a result, the front-end service 101 that processes messages can be controlled to deal only with the session keys specified for decrypting specified messages, rather than storing the private keys in memory. This distributed configuration can provide more flexibility in the configuration to allow the front-end 101 to be implemented as an extension or plug-in to a third-party eDiscovery solution or as extension to existing cryptographic providers. In addition, the distributed configuration can strengthen an organization's security profile by segregating personnel and management responsibilities for the two major components. In addition, this option enables the back-end service 103 to be used for a larger role such as a centralized private key recovery system.

The back end service 103 includes components specified to enable the system to provide the required session key decryption service to the front end.

The backend service 103 and related components can be configured to provide the information by the front end for decrypting encrypted messages, without exposing specified private keys to the decryption service. The backend system can be configured to decrypt the ESK and provide the un-encrypted version to the requesting service. The service provided by the backend 103 can be implemented using several communication protocols as needed. While the front end service 101 and the backend service 103 can be implemented on the same device, one exemplary embodiment specifies the segregation of the front end from the backend. This distributed configuration provides improved security and compliance and is discussed in further detail.

FIG. 1 illustrates a system front end in accordance with an exemplary embodiment of the present disclosure. The front end components consist of the input adaptors, the decryption engine, and output adaptors.

As shown in FIG. 1, the front end 101 can include an input adaptor 104, and output adaptor 106, and decryption engine. The input adaptor 104 can be configured to have varying features, for example:

In an exemplary embodiment, the input adaptor 104 can be configured to receive messages over a network by interacting with e-Mail systems such as Exchange, Lotus Notes, or other suitable email systems as desired. The communication can be carried through many known communication protocols such as Web services, Simple Mail Transfer Protocol (SMTP), Post Office Protocol (POP), or Internet Message Access Protocol (IMAP), or any other suitable transmission protocol as desired.

In another exemplary embodiment, the input adaptor 104 can be configured to receive messages over a network by inspecting Personal Storage Table (PST), Offline Storage Table (OST), Encrypted File System (EFS), or Notes Storage Facility (NSF) files. This interception can be done by either reading these files directly from the file system, through a provider such as Outlook or Notes, or by intercepting decryption calls from native Cryptographic API such as Microsoft Cryptography API (CryptoAPI), CAPICOM or Cryptography Next Generation (CNG) provider.

In yet another exemplary embodiment, the input adaptor 104 can be configured to receive messages over a network by monitoring network traffic for inspection. The network traffic can be sent to a parser to detect an isolated encrypted message for further processing.

According to exemplary embodiments of the present disclosure the output adaptor 106 can be configured to have anyone or combination of features, for example:

In an exemplary embodiment the output adaptor 106 can be configured to send decrypted messages to consuming systems through many known communication protocols such as Web services, Simple Mail Transfer Protocol (SMTP), Post Office Protocol (POP), or Internet Message Access Protocol (IMAP), or any other suitable transmission protocol as desired.

According to another exemplary embodiment the output adaptor 106 can be configured to save decrypted messages to Personal Storage Table (PST), Offline Storage Table (OST), Encrypted File System (EFS), or Notes Storage Facility (NSF) files. The system 100 can then create new files from the decrypted content or save the unencrypted messages back to the same input files.

In yet another exemplary embodiment, the decrypted messages can be passed to inspection plug-in for further action.

The front-end 101 of the system 100 can include a Decryption Engine 108. The Decryption Engine can be configured to decrypt the encrypted messages. In an exemplary embodiment the Decryption Engine 108 communicates with a backend 103 of the system 100 to decrypt the encrypted session key of the message, thereby eliminating the need for the decryption engine to store or use the highly sensitive private key(s). The Decryption Engine 108 can also be configured to perform the following:

Receive the encrypted message from the input adaptor 104;

From the encrypted message header, retrieve certificate identifiers with the corresponding Encrypted Session Keys (ESK) and other information needed for the decryption. The ESK is an encrypted version of the symmetric session key (SK) used to encrypt the message. The header can be formed according to a Cryptographic Message Syntax (CMS) RFC 5652, and can include the certificate identifiers for the sender and all recipients. The certificate identifier can be presented either as Subject Key Identifier or as a certificate Serial Numbers and the issuer name.

Since the corresponding private keys are not present in the Decryption Engine 108, the decryption service uses this information to communicate with a backend system 103 that decrypts the session key and returns the unencrypted session key to the Decryption Engine 108, and the unencrypted session key is used to decrypt the message before sending it to the output adaptor 106. This method to use the unencrypted session key for decryption of the message, and not the private key which is highly sensitive, provides an improvement over known systems in the compliance and security of the decryption service.

Figure 2:
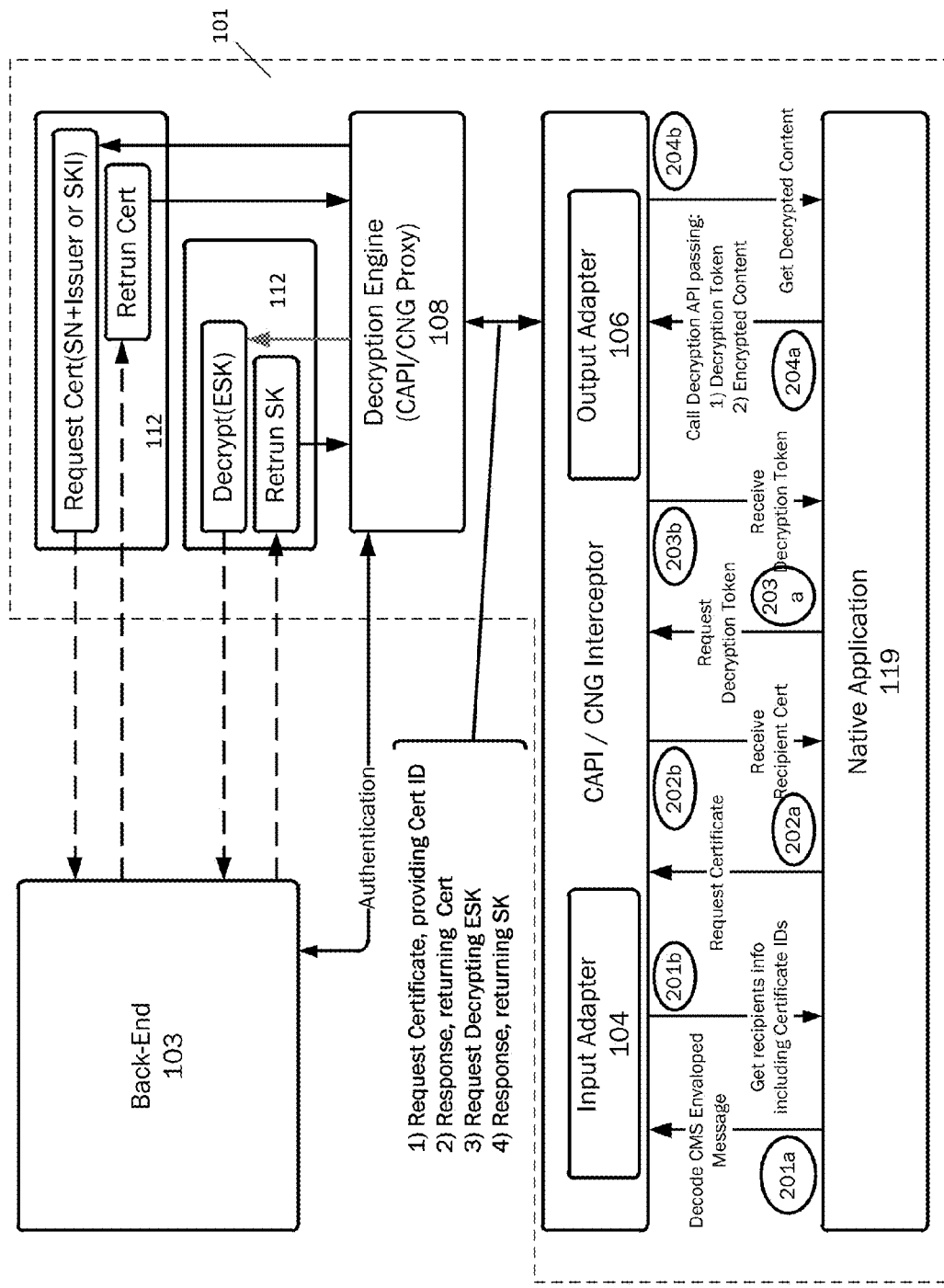
FIG. 2 illustrates a flow diagram of data communication between an input and output adaptor in accordance with an exemplary embodiment of the present disclosure.

FIG. 2 illustrates a flow diagram of data communication between an input and output adaptor in accordance with an exemplary embodiment of the present disclosure.

As shown in FIG. 2, the system 100 provides a generic decryption service to any application that uses standard cryptographic APIs such as CAPI or CNG. In an exemplary embodiment, the input and the output adaptor are implemented as cryptographic APIs interceptors 118. When native application such as Outlook try to use CAPI to decrypt an encrypted message, the system CAP I/CNG interceptor 118 intercepts some of the calls and provides the specified information that allows the requested application to proceed with the decryption operation.

In an exemplary embodiment, the CAPI/CNG interceptor 118 can perform the following:

S201. As any CAP I-aware application configured on the computing device encounters an encrypted message that needs to be decrypted, the application causes the front end 101 to request the message header from the configured CAPI provider (201*a*). The configured CAPI provider decodes the CMS enveloped message and returns to the application the list of the certificate IDs that are needed to decrypt the message (201*b*).

S202. The front end 101 then sends a request to the CAPI provider requesting recipients' certificates (202*a*). Calls are intercepted by the system input adaptor 104 and are forwarded to the decryption engine 108. The decryption engine 108 uses the provided information to get the associated certificates from the backend system 103 then provides them to the requesting application (202*b*).

S203. The requesting application then sends a request to CAPI 118 requesting a decryption token (203*a*). The decryption token is a handle to the cryptographic provider that is able to decrypt the encrypted session key. This call is also intercepted by the input adaptor 104 and a handle response is provided back (203*b*).

S204. The requesting application now sends the handle to CAPI 118 to decrypt the ESK (204*a*). This call is intercepted by the system input adaptor 104 and the request is forwarded to the decryption engine 108. The decryption engine 108 uses the provided information which includes the encrypted session key (ESK) and communicates with the backend system 103 to retrieve the associated SK which is used to decrypt the message content (204*b*).

Figure 3:
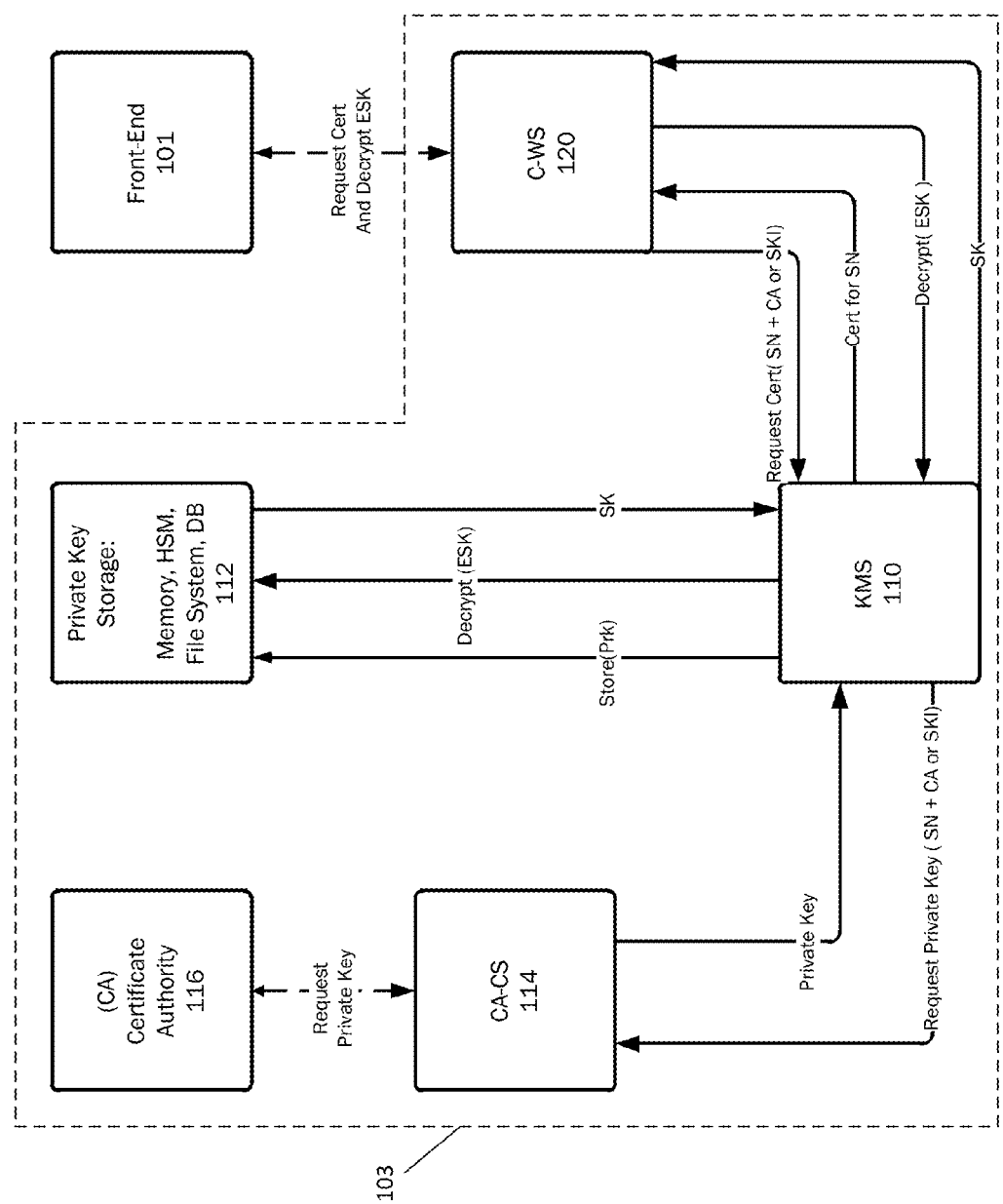
FIG. 3 illustrates a system back end in accordance with an exemplary embodiment of the present disclosure.

FIG. 3 illustrates the back end components in accordance with an exemplary embodiment of the present disclosure.

As shown in FIG. 3, the communication between front end 101 and backend 103 are controlled by a communication Web service (CW-S) 120 hosted in the back end system 103. The backend system 103 includes all the components 120 needed to decrypt the ESK and return it to the front end system 103 for processing. The private keys can either be protected by an HSM 112, or reside locally in memory, or reside in another medium. The backend system 103 can be configured to securely retrieve private keys from configured Certificate Authority 116 and securely store them locally or on associated HSM 112.

The system backend 103 can be configured to provide the information needed by the front end 101 to allow it to decrypt encrypted messages, without the need to expose private keys to the decryption service 108. The ultimate role of the backend 103 is to decrypt the ESK and provide the unencrypted version to the front end 101. In this example the communication between the front end 101 and the backend 103 is implemented as a Web service interface over Transport Layer Security protocol (TLS).

According to an exemplary embodiment, the backend 103 is configured to decrypt the ESK and send the corresponding SK back to the front end 101. This process can be performed as follows:

- The communication web service (C-WS) 120 receives some certificate identifiers with the corresponding Encrypted Session Keys (ESK) from the system front end 101.
- C-WS 120 forwards the request to the system Key Management Server (KMS) 110, which handles communication with the private keys repository regardless of their storage and protection level.
- The KMS 110 checks to see if it has a cached copy of a corresponding private key for decrypting the ESK. If a cached copy is found, the KMS 110 uses the copy to decrypt the ESK and send the decrypted key (SK) back to the requestor. Such cache copy can be protected inside HSM 112.
- If the KMS 110 does not have any corresponding private keys, it will authenticate with the associated Certificate Authority (CA) 116, and request the corresponding private key.
- The associated CA 116 can securely return the requested private key which the KMS 110 can store in its cache including HSM storage 113. Once in cache, the KMS 110 can use the private key to decrypt ESK and return the associated SK to the requestor.

Figure 4:
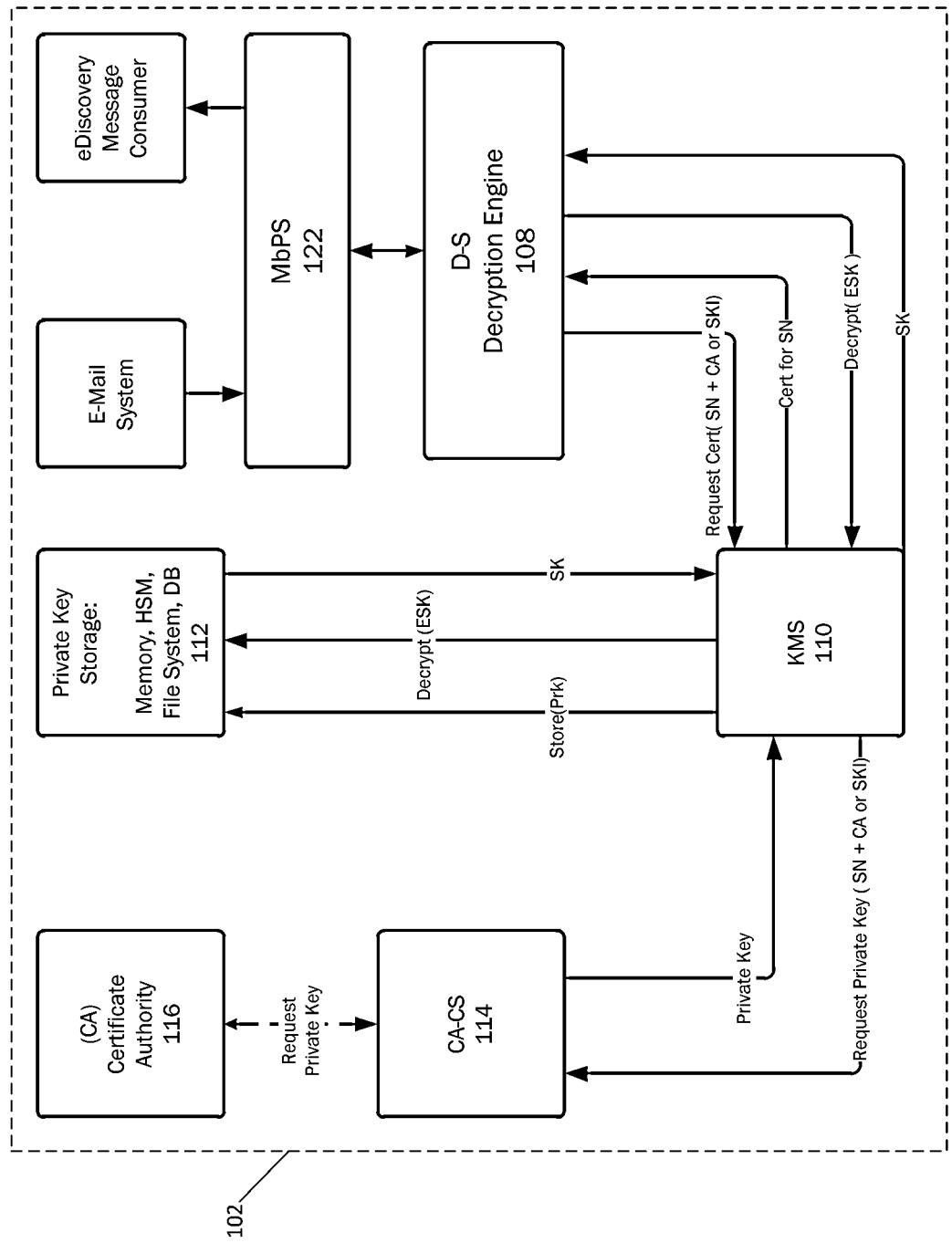
FIG. 4 illustrates a centralized system architecture in accordance with an exemplary embodiment of the present disclosure.

FIG. 4 illustrates a centralized system architecture in accordance with an exemplary embodiment of the present disclosure. According to an exemplary embodiment described herein, the centralized system architecture is configured so that the input adaptor 104 can read messages from mail system journaling mailboxes and send the output to an eDiscovery message consumer using SMTP output adaptor 106.

As already discussed, the centralized system architecture can be implemented on a single computing device. The computing device 102 can be configured to include features (e.g., hardware and software) specified for receiving encrypted email messages, decrypting the received email messages, and sending the decrypted email message to the eDiscovery message consumer. The computing device 102 can maintain an encrypted copy of specified private keys either in memory or in HSM 112. Before communicating with configured Certificate Authority 116 to retrieve a user's keys, the KMS 110 can check its memory cache or its configured HSM 112 to determine whether an appropriate key exists. If a match is not found, the computing device 102 communicates with the Certificate Authority 114 to retrieve an encrypted version of the user's private key. After retrieving user's encrypted private key, the CA communication service 116 either stores the encrypted keys in their retrieved format in memory or the configured HSM 112 for caching.

According to another exemplary embodiment of the present disclosure, the centralized system architecture can be configured as follows:

1. The computing device 102 can be configured to pull messages from multiple sources based on the implementation specified by the input adaptor 104. For example, in an exemplary embodiment, the input adaptor 104 can read messages from an electronic mail system over a network. In this scenario a system administrator can specify a list of Mailboxes from which the system 100 can pull messages, such as any of a plurality of Mail Servers on the network. At least one of the mail servers can be configured for journaling (e.g., retaining information relating to electronic messages), such that the input adaptor 104 computing device can pull messages from one or more journaling mailboxes for processing.

2. According to an exemplary embodiment, the input and output adaptor 104, 106 can be managed by a Mailbox Processing Service (MbP-S) 122. The MbP-S 122 can be configured to handle all mail flow to and from the system, and runs using a special service account. The MbP-S 122 accounts can have Full Access Permission for the list of Journaling Mailboxes to be processed. The MbP-S 122 can also be configured to include a Management Tool that allows system administrators to remove or add Mailboxes to the list. As it relates to the messages, the computing device 102 via the MbP-S 122 can either delete or keep messages in the journaling mailboxes after successful processing. The Management Tool can allow authorized system administrators for the journaling mailbox to handle processed or failed messages in bulk.

3. If a message received by the MbP-S 122 is not encrypted, it will pass the message to the eDiscovery Messages Consumer without any decryption action. As already discussed, the MbP-S 122 can deliver processed messages via SMTP, and other methods of message delivery can be added as needed.

4. The computing device 102 can be configured to include a Decryption Service (D-S) 108 to which encrypted messages are passed. Through the Decryption Service (D-S) 108 the computing device 102 can be configured to perform the following:
   a. Receive the Encrypted Message from MbP-Service 122.
   b. From the Encrypted Message Header, extract certificate identifiers with the corresponding Encrypted Session Keys (ESK) and pass the extracted certificate identify to the system Key Management Service (KMS) 110.
   c. Receive the unencrypted Session Key (SK) from the KMS 110.
   d. Use the SK to decrypt the message and send the decrypted message to MbP-S 122.

5. As already discussed, the front end 101 can be configured to include a Key Management Service (KMS) 110. An exemplary primary function of the KMS 110 of the computing device 102 is to decrypt the received Encrypted Session Key (ESK) and return the corresponding unencrypted session key (SK).

6. As the KMS 110 receives the list of certificate identifiers with corresponding ESKs, the KMS 110 enumerates the list and checks whether a corresponding encrypted private key is stored in resident (e.g., on-board) memory or HSM 112.

7. The computing device 102 uses memory or the HSM 112 to store the encrypted private keys. The storage of the keys enables the computing device 102 to minimize future communication with the corresponding CAs 116 and obtain faster decryption speeds.

8. If the KMS 110 finds a corresponding key in memory or HSM 112, the private key of a Recovery Agent 126 is used to decrypt the matching private key and this key is used to decrypt the encrypted session key. The decrypted session key is then sent to the decryption service (D-S) 108.

9. If the KMS 110 fails to find a corresponding private key in memory or in its configured HSM 112, KMS 110 passes the request to CA Communication Service (CA-CS) 114.
10. The computing device 102 can be configured to include a CA Communication Service (CA-CS) 114. This service is associated with an account that has an authorization (e.g., rights) to retrieve an Encrypted User Private Key (EU-PRK) from the corresponding Certificate Authority (CA) 116. The computing device 102 can be configured to support multiple Certificate Authority products, including, for example, Microsoft CA and Entrust CA, or any other CA platform as desired.
11. The CA-CS 114 establishes a secure communication session with the associated CA 116. The CA-CS 114 authenticates the CA 116 with specified credentials. Following authentication, the CA-CS 114 retrieves the EU-PRK based on the request. The CA-CS 114 ends the communication session when it successfully receives a specified EU-PRK from the Certificate Authority 116.
12. The retrieved protected private key is then forwarded to KMS 110 for processing
13. The computing device 102 stores the EU-PRK received via the KMS 110 in memory or associated HSM 112 for caching.
14. The KMS 110 then uses the private key of the Key Recovery Agent 126 to decrypt EU-PRK to retrieve the private key which is used to decrypt the ESK and retrieve the SK.
15. The KMS 110 returns the SK to the decryption service (D-S) 108 of the computing device 102.
16. The D-S 108 uses the SK to decrypt the message. The decrypted message is sent to the MbP-Service 122, which forwards the message to the eDiscovery Message Consumer.
17. The eDiscovery Message consumer is the ultimate receiver of the decrypted messages.

Figure 5:
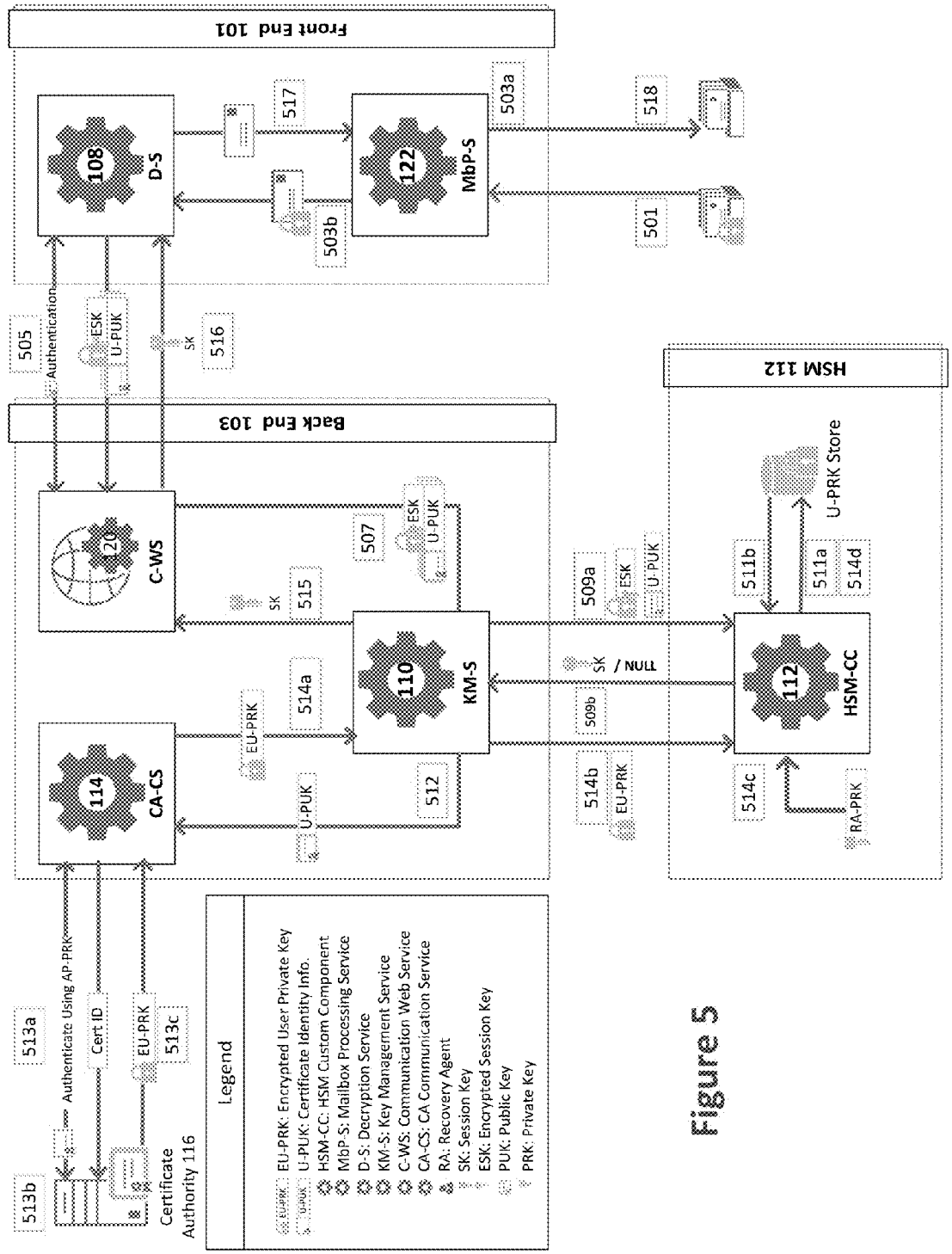
FIG. 5 illustrates a distributed system architecture in accordance with an exemplary embodiment of the present disclosure.

FIG. 5 illustrates a distributed system architecture in accordance with an exemplary embodiment of the present disclosure.

For the distributed configuration of the system, an exemplary communication protocol is configured to use a Web service interface over Transport Layer Security. protocol (TLS) TLS provides a communication security layer to protect communication. While this is just one of numerous possible implementations, an exemplary method of the present disclosure will be described using the TLS protocol. In a system having a distributed configuration, the system can also include an authentication and authorization mechanism to ensure security. However, the specific authentication and authorization utilized are not part of the system described herein.

In an exemplary embodiment of the present disclosure, the backend 103 when configured as a Web service implements the following two calls:

Request Certificate: this call can have two implementations. In a first call, the front end 101 can provide the Certificate Serial Number and the certificate issuer name. The backend will return the requested X.509 certificate. The backend 103 must also implement another instance of this method to accept the Subject Key identifier and return the requested X.509 certificate.

Decrypt ESK: this call can decrypt the encrypted session key (ESK). The backend 103 receives the ESK from the front end 101 and returns the corresponding decrypted session key (SK). To help in the calculation, the front end 101 can also pass information about the certificates as is performed in the Request Certificate call already discussed.

To return the decrypted SK to the front end decryption engine 108, the backend system 103 should have access to the private keys used to decrypt the session keys. This feature can be used based on the level of protection needed and the level of automation that is specified. The system 100 can have a Key Management Service (KMS) 110 that handles communication with the repository of user private keys regardless of their storage and protection level.

In an exemplary embodiment the system 100 can be configured to fall outside of compliance with the FIPS 140-2 specification. As a result, private keys can be stored encrypted on one or more storage devices. Memory storage 111 can be used for caching, and this cache can be persistent if stored in the file system or a database.

In other exemplary embodiments, the system 100 can be FIPS 140-2 compliant. As a result, the private keys should be protected using Hardware Security Modules (HSM) 112 or other suitable and/or FIPS approved private key protection devices approved for use. In this scenario, the backend system 103 can be equipped with an HSM 112 to accomplish the specified level of private key protection.

An HSM 112 can perform private Key protection in multiple ways, among them:
1. Using a master private key that is managed by the by the HSM 112 to protect and access user private keys inside the backend system 103.
2. Store all users' private keys through HSM 112, thereby the HSM 112 provides all private key protection.

The first private key protection option is limited its capability to provide a FIPS 140.2 compliant private key protection for Smart Card and Personal Identity Verification (PIV) card use.

The second private key protection option provides a FIPS 140.2 compliant level of protection, and adds a level of deployment complexity regarding the allocation of private key inside the HSM 112. The system 100 provides multiple configuration options to move the private keys to the associated HSM 112. This can be done either out of band or by the system 100 itself. In the out of band solution, an external system (not shown) will move these private keys to the HSM 112. This external system can run periodically and add newly created private keys to the associated HSM 112. A second approach is to configure the backend 103 to retrieve these private keys as needed and move them to the HSM 112.

Once the private keys are protected with the associated HSM 112, the KMS 110 can then pass the ESK to the HSM 112 for decryption. KMS 110 will then return the SK to the requested service. To help with this operation the KMS 110 can include a table that associates certificate identifiers with the HSM 112 identifying information. This table can be managed as part of the process to add private keys to the HSM 112.

According to another exemplary embodiment, private key re-allocation to the HSM 112 is not performed. As a result, the system can have another service component communicate with an associated Certificate Authority (CA) 116. This other service component is a CA Communication Service (CA-CS) 114. The CA-CS 114 can be configured to securely communicate with a corresponding CA 116 and securely retrieve the required specified private key from the associated CA 116 and pass it to the KMS 110. The KMS 110 will then communicate securely with the HSM 112 to store the private key for protection.

After completing the authentication, the corresponding CA 116 can return the requested private key encrypted with a key Recovery Agent (RA) certificate. The RA private key can be used to decrypt the retrieved private key. According to exemplary embodiments of the present disclosure, the description can be performed inside the HSM 112 in order to ensure that the system 110 does not have access to any private key in plain format outside of the HSM 112.

Figure 6:
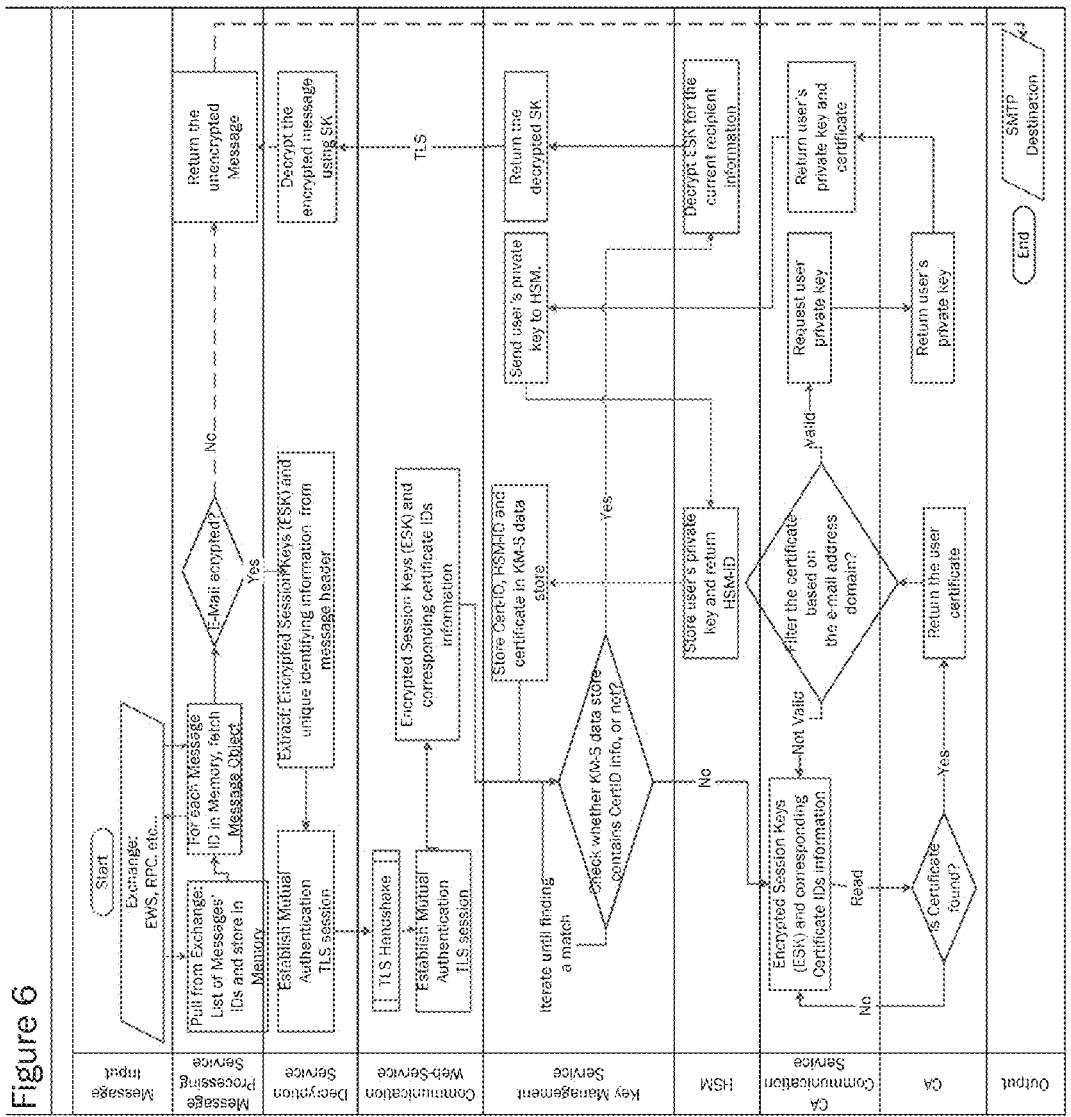
FIG. 6 illustrates flow diagram for a distributed system architecture in accordance with an exemplary embodiment of the present disclosure.

FIG. 6 illustrates flow diagram for a distributed system architecture in accordance with an exemplary embodiment of the present disclosure. As already discussed, under a distributed architecture, the computing device 102 is configured to have two functional components that include a back end service 103 and front end service 101. The back end service 105 provides the key recovery and management while the message decryption is accomplished on the front end 101. This design enables the front end 101 to be implemented as extensions or plug-in to existing eDiscovery solutions. It also allows the back-end service 103 to be implemented as a centralized private key recovery system. As with the centralized system, the distributed option can be implemented with an HSM for FIPS 140-2 compliance, or without an HSM.

According to an exemplary embodiment of the present disclosure, the distribute system architecture is configured to have the input adaptor 104 is implemented to point to mail system journaling mailboxes and send the output to SMTP output adaptor 1-6. The distributed system architecture also uses HSM 112 as its main medium of private key storage.

As shown in FIGS. 5 and 6 the distributed system architecture and process for file decryption without access to a decryption key is as follows:

S501. The computing device can be an exemplary configuration of configured to receive messages via an eDiscovery system through the front end component 101. The front end component 101 can be configured as a plug-in to Outlook, as an extension to existing eDiscovery platform, or as a standalone service that point to message source. In this exemplary embodiment, the input adaptor 101 can be configured to read messages from Mail systems journaling mailboxes.

S502. The Mailbox Processing Service (MbP-S) 112 corresponds to the specific implementation of the system input and output adaptors 104, 106. The MbP-S service 122 can monitor and/or manage all mail flow to and from the system.

S503. If the message received by the MbP-S 122 is unencrypted, the message is passed to the eDiscovery Messages Consumer without any decryption action (503*a*). Encrypted messages, however, can be passed to a Decryption Service (D-S) of the computing device 102 (503*b*).

S504. The computing device 102 can be configured such that the Decryption Service (D-S) 108 is also allocated to the front end component 101. Through the D-S 108, the computing device 102 can be configured to perform the following:
  a. Receive the Encrypted Message from MbP-Service 122.
  b. Extract the Encrypted Session Key (ESK) and the list of user's certificates (U-PUK) that can be used to decrypt the ESK from the Message Header.
  c. Send the ESK and the U-PUKs to the backend service 103.
  d. Receive the unencrypted Session Key.
  e. Use the unencrypted SK to decrypt the message and send it to MbP-S 122.

S505. Because in the distributed system architecture is divided into two components, robust authentication between the front-end 103 and the back-end is used to provide a secure communication environment. The system will support multiple authentication options including certificate based authentication.

S506. To this end, the computing device 102 back-end is configured to include a Communication Web Service (C-WS) 120, which provides an interface for establishing a secure communication session between the front-end 101 and the back-end 103.

S507. After authenticating the front end 101, the C-WS 120 receives the ESK and the U-PRK list from the D-S 108 and passes both to the Key Management Service (KMS) 110. The list of U-PUK sent can be filtered. The filtering can allow organizations to target certificates based on predefined set of criteria such as email domain.

S508. The KMS 110 allows for communication with a third-party Hardware Security Model (HSM) 112 for key storage and recovery. In accordance with an exemplary embodiment, the third party HSM 112 should be employed to meet FIPS 140-2 requirements regarding separation of cryptographic keys. The computing device 102 can be called on to access the HSM 112 for overall system operation or functionality.

S509. A primary function of the KMS 110 of the computing device 102 is to decrypt the received Encrypted Session Key (ESK) and return the corresponding unencrypted session key (SK). KMS 110 establishes a secure communication session with the HSM 112 through an optional custom add-in to HSM 112 called HSM Custom Component (HSM-CC) 128. KMS 110 enumerates the U-PUK list and sends each element along the ESK to the HSM-CC 128 in order to receive the unencrypted version of the ESK (509*a*). There are different paths to accomplish this task based on the information stored in the HSM 112, which will be explained in the following steps.

S510. To provide robust key protection, the HSM Custom Component (HSM-CC) 128 resides inside the HSM 112. All communication between the computing device 102 and the HSM 112 goes through this custom component. The computing device 102 does not expose or store any private keys when configured with an HSM 112 having an HSM-CC 128. The HSM-CC 128 can be configured to include the private key 112 and/or the Recovery Agent (RA) 126. It should be noted, however, that the computing device does not have direct access to the private key stored in the HSM 112.

S511. The HSM-CC 128 receives the ESK and a U-PUK that can decrypt the ESK and checks for a match in the HSM 112 user's private key (U-PRK) store (511*b*). If a U-PRK match is found for the corresponding U-PUK, then the HSM-CC 128 decrypts SK and sends the unencrypted session key (SK) to the KMS 110 of the computing device 102 (509*b*). On the other hand, if a corresponding private key does not exist, the matching effort continues until the entire list of U-PUKs is exhausted. In this case the KMS 110 takes over and tries to provide the HSM 122 with the specified encrypted private key 110 (EU-PRK) obtained from the Certificate Authority 116.

S512. When the communication between the KMS 110 and HSM-CC 128 does not produce an associated or appropriate (SK), the KMS 110 sends the list of U-PUKs to the CA communication Service (CA-CS) 114 in an effort to obtain the U-PRK and provide it to the HSM-CC 128.

S513. The CA Communication Service (CA-CS) 114, is authorized to retrieve the Encrypted User Private Key (EU-PRK) from the corresponding CA 116. This process can be performed automatically an on-demand to aid in decrypting the ESK. The CA-CS 114 and CA 116 establish a secure communication session for the exchange of information and data (513a). The CA-CS 114 supports multiple Certificates Authority products, including Microsoft CA and Entrust CA. As the CA-CS 114 receives the list of U-PUKs via the KMS 110, the CA-CS 114 enumerates the list, authenticates the list and sends it to the CA 116 with the specified credentials, and retrieves the EU-PRK that corresponds to the provided U-PUK from the CA 116 (513c). The CA-CS ends the communication session after it successfully receives an EU-PRK from the Certificate Authority 116.

S514. The CA-CS 114 of the computing device 102 sends the successfully retrieved EU-PRK to the KMS 110 (514a) which then forwards the IU-PRK to HSM-CC 128 (514b). The HSM-CC 128 uses the RA-PRK to decrypt the EU-PRK and obtain the User Private Key (514c). The User Private Key is stored in the HSM U-PRK Store (514d).

S515. The HSM-CS 128 decrypts the ESK with the U-PRK as described above. The SK (unencrypted version of the ESK) is then forwarded to the C-WS 120.

S516. The C-WS 120 will then send the SK to the front end Decryption Service 108 via the secure communication session.

S517. The D-S 108 uses the SK to decrypt the message and send it to the MbP-Service 122 which will forward as needed.

In accordance with exemplary embodiments of the present disclosure, the computing device can be configured to include and perform features of the exemplary embodiments of the present disclosure through program code stored in a non-volatile memory device, such as Read-Only Memory (ROM), erasable programmable read-only memory (EPROM), or other suitable memory device or circuit as desired. In an exemplary embodiment, the program code can be recorded on a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processors for execution as desired.

Techniques consistent with the present disclosure provide, among other features, system and method for email and file decryption on a network without direct access to a required decryption key. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A system for decrypting electronic messages, comprising:

a first processor configured to have a front end processing unit and a back end processing unit, wherein the front end processing unit receives or monitors electronic messages that are in-flight from electronic message sources to downstream destinations on a network for encrypted messages, wherein private keys associated with the encrypted messages are not previously provided to or stored in association with the first processor, wherein for each electronic message the front end processing unit extracts a set of user certificate identifiers and corresponding encrypted session keys, wherein the back end processing unit includes a second processor for executing a hardware security model (HSM), the back end processing unit being configured with access rights to retrieve the private keys from a certificate authority, and for each message the back end processing unit securely communicates with the certificate authority to acquire a private key, which is not previously provided to second processor or stored in the HSM, for decrypting a respective encrypted session key, securely stores the acquired private key in the HSM, decrypts the encrypted session key in the HSM using the private key, and sends the unencrypted session key to the front end processing unit, and wherein the front end processing unit decrypts the encrypted messages with the unencrypted session key.

2. A method for decrypting electronic messages in a system having at least one computing device connected to a network, the method comprising:

retrieving, via a back end processing unit of the at least one computing device, private keys from a certificate authority, wherein the back end processing unit is configured with access rights to retrieve the private keys;

executing, via a processor of the at least one computing device, a hardware security model (HSM);

receiving or monitoring, via a front end processing unit of the at least one computing device, a network for encrypted messages that are in-flight from at least one message source to a recipient on the network, wherein private keys associated with the encrypted messages are not previously provided to the system; and for each received message:

extracting, via the front end processing unit, a set of user certificate identifiers and corresponding encrypted session keys;

via the back end processing unit:

securely communicating with a private key provider to obtain a private key, which is not previously provided to or stored in association with the back end processing unit, for decrypting a respective encrypted session key;

securely storing the obtained private key in the HSM;

decrypting the encrypted session key in the HSM using the private key; and sending the unencrypted session key to the front end processing unit; and decrypting, via the front-end processing unit, the encrypted messages with the unencrypted session key.

3. The method of claim 2, wherein the computing device is configured to execute an application, and wherein extracting the set of user certificate identifiers comprises:
- requesting, via the front end processing unit, a message header from the application via an input adapter; and
- decoding the message, via the front end processing unit, and returning the set of user certificate identifiers to a requesting application.

4. The method of claim 3 comprising:
- requesting from the application, via the front end processing unit, user certificate identifiers of recipients.

5. The method of claim 4, comprising:
- obtaining, via the front end processing unit, user certificates associated with recipients of the messages from the application.

6. The method of claim 5, comprising:
- sending, via the front end processing unit, the user certificates to the back end processing unit.

7. The method of claim 6, comprising:
- requesting, via the application, a decryption token for decrypting the respective encrypted session key.

8. The method of claim 7, comprising:
- intercepting, via the front end processing unit the request for the decryption token and providing a handle response to the requesting application.

9. The method of claim 8, comprising:
- sending, via the application, a first request for decrypting the respective encrypted session key based on the handle response.

10. The method of claim 9, comprising:
- intercepting, via the front end processing unit, the first request and forwarding the intercepted request to a decryption engine.

11. The method of claim 10, comprising:
- communicating, via the decryption engine, with the back end processing unit to retrieve the unencrypted session key.

12. The method of claim 1, wherein the message is decrypted while message packets are in-flight.

13. The method of claim 1, comprising:
- retrieving, via the back end processing unit, the private key corresponding to the encrypted session key from a certificate authority over the network; and
- decrypting, via the back end processing unit, the respective encrypted session key based on the retrieved private key.

14. The method of claim 13, wherein the private key is retrieved on-demand.

15. The method of claim 14, wherein the private key is retrieved automatically.

16. A non-transitory computer readable medium for executing a method for decrypting electronic messages in a network, the medium having program code recorded thereon such that when placed in communicable contact with at least one processor, the at least one processor is configured to have a front end processing unit and a back end processing unit and the at least one processor performs the steps of:
- monitoring, via the front end processing unit, the network for encrypted messages that are in-flight from at least one electronic message source to a recipient, wherein private keys associated with the encrypted messages of the message source are not previously provided to the at least one processor; and
- for each received message:
  - extracting, via the front end processing unit, a set of user certificate identifiers and corresponding encrypted session keys;
  - the back end processing unit is configured with access rights to retrieve private keys from a key management server and for executing a hardware security model (HSM), wherein the retrieved private keys are not previously provided to or stored in association with the back end processing unit, for the back end processing unit the at least one processor:
    - sending user certificate identifiers to the key management server to obtain a private key for decrypting a respective encrypted session key; and
    - securely storing the obtained private key in the HSM;
    - decrypting the encrypted session key in the HSM using the private key; and
    - sending the unencrypted session key to the front end processing unit,
  - wherein, via the front end processing unit, the at least one processor decrypts the encrypted messages with the unencrypted session key.

17. The method of claim 16, wherein the at least one processor is configured to execute an application, and extracting the set of user certificate identifiers comprises:
- requesting, via the front end processing unit, a message header from the application via an input adapter; and
- decoding, via the front end processing unit, the message and returning the set of user certificate identifiers to a requesting application.

18. The method of claim 17 comprising:
- obtaining, via the back end processing unit, the private key from the HSM.

19. The method of claim 17, comprising:
- obtaining, via the back end processing unit, the private key on demand from an associated certificate authority.

* * * * *